United States Patent [19]

Morimoto et al.

[11] Patent Number: 4,725,927
[45] Date of Patent: Feb. 16, 1988

[54] ELECTRIC DOUBLE LAYER CAPACITOR

[75] Inventors: Takeshi Morimoto; Kazuya Hiratsuka; Yasuhiro Sanada; Hiroshi Aruga, all of Yokohama, Japan

[73] Assignees: Asahi Glass Company Ltd., Tokyo; Elna Company Ltd., Fujisawa, both of Japan

[21] Appl. No.: 35,866

[22] Filed: Apr. 8, 1987

[30] Foreign Application Priority Data

| Apr. 8, 1986 | [JP] | Japan | 61-79206 |
| Jul. 3, 1986 | [JP] | Japan | 61-155027 |
| Jul. 3, 1986 | [JP] | Japan | 61-155028 |
| Sep. 30, 1986 | [JP] | Japan | 61-229950 |

[51] Int. Cl.$^4$ .............................. H01G 9/02
[52] U.S. Cl. ............................. 361/433; 252/62.2
[58] Field of Search ................. 361/433; 252/62.2

[56] References Cited

U.S. PATENT DOCUMENTS

| 2,965,690 | 12/1960 | Petersen et al. | 361/433 |
| 3,255,391 | 6/1966 | Yamamoto | 361/433 X |
| 3,551,755 | 12/1970 | Bode et al. | 252/62.2 X |
| 3,601,665 | 8/1971 | O'Nan et al. | 252/62.2 X |

*Primary Examiner*—Donald A. Griffin
*Attorney, Agent, or Firm*—Oblon, Fisher, Spivak, McClelland & Maier

[57] ABSTRACT

An electric double layer capacitor utilizing an electric double layer formed by the interface of an electrolyte solution and polarizable electrodes, wherein the electrolyte solution comprises a solute dissolved in at least one solvent selected from the group consisting of sulfolane and a derivative thereof.

9 Claims, 2 Drawing Figures

ELECTRIC DOUBLE LAYER CAPACITOR

BACKGROUND OF THE INVENTION

1. Field of the Invention

The present invention relates to an electric double layer capacitor, and more particularly to an electric double layer capacitor having excellent high temperature load characteristics and low temperature characteristics.

2. Discussion of Background

As an electrolyte solution to be used for such an electric double layer capacitor, there have been proposed electrolyte solutions obtained by dissolving an electrolyte such as a tetraalkylammonium salt, ammonium salt or alkali metal salt of perchloric acid, hexafluorophosphoric acid, tetrafluoroboric acid or trifluoromethane sulfonic acid, in an organic solvent such as propylene carbonate, γ-butyrolactone, acetonitlile or dimethylformamide (Japanese Unexamined Patent Publications Nos. 50255/1973, 68254/1974 and 232409/1984).

However, with such conventional electric double layer capacitors, the working voltage per unit cell was about 1.8 V. A working voltage at a level of 5.5 V is required for their main use as a memory back-up electric power source. Therefore, it has been common to laminate three cells in series to obtain a commercial product. If the working voltage per unit cell can be improved to a level of 2.75 V or higher, the desired level of working voltage can be obtained by laminating only two cells, whereby the costs can be reduced. On the other hand, with conventional electric double layer capacitors, if a working voltage of 2.75 or higher is applied, decomposition of the solvent of the electrolyte solution occurs, thus leading to problems such that the capacity decreases, the internal resistance increases since the outer casing expands due to the generation of gas, and further the electrolyte solution is likely to leak from the cells. Such phenomena for degradation are remarkable particularly when the capacitors are used at high temperatures.

SUMMARY OF THE INVENTION

It is an object of the present invention to solve the above-mentioned problems.

The present invention provides an electric double layer capacitor utilizing an electric double layer formed by the interface of an electrolyte solution and polarizable electrodes, wherein the electrolyte solution comprises a solute dissolved in at least one solvent selected from the group consisting of sulfolane and a derivative thereof.

DETAILED DESCRIPTION OF THE PREFERRED EMBODIMENTS

Figure 1:
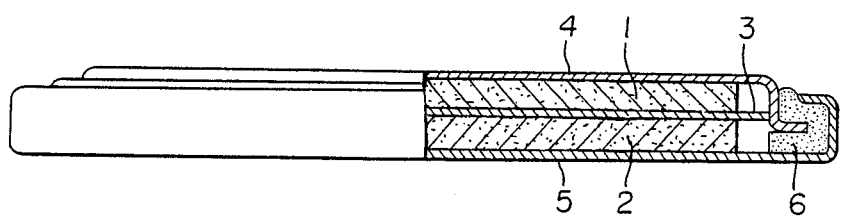
FIG. 1 is a partially cross-sectional view of an embodiment of the electric double layer capacitor of the present invention.

In the present invention, the derivative of sulfolane to be used as a solvent for electrolyte is preferably 3-methylsulfolane or 2,4-dimethylsulfolane. Such sulfolane or its derivatives may be used alone independently. However, in some cases, such sulfolane and its derivative may be used in combination as a solvent mixture in the present invention. Sulfolane by itself has a solidifying point as high as 28.5° C. and a high dielectric constant as its characteristic. Whereas, 3-methylsulfolane or 2,4-dimethylsulfolane has a low solidifying point and has good low temperature characteristics. Therefore, such a solvent mixture may have the characteristics of both materials i.e. good low temperature characteristics and high dielectric constant. When sulfolane is mixed with its derivative, the amount of the derivative is preferably from 20 to 70% by weight, more preferably from 30 to 60% by weight, to obtain adequate low temperature characteristics and low internal resistance.

Sulfolane and sulfolane derivatives such as 3-methylsulfolane and 2,4-dimethylsulfolane, to be used in the present invention, have high electrochemical stability, and they are hardly susceptible to electrolytic oxidation or reduction. They have a wide useful range of electric potential. Thus, they are suitable as a solvent for electrolyte to be used for an electric double layer capacitor, and they are capable of providing an electric double layer capacitor having a highly dependable excellent working voltage characteristic, whereby no decomposition of the solvent results even when a high voltage of 3 V or higher is applied.

However, a sulfolane solvent has a high viscosity and a relatively high solidifying point. Therefore, when it is used for an electrolyte solution, the electric conductivity tends to be low, and the internal resistance of the capacitor tends to increase particularly in a low temperature region, whereby the capacity is likely to decrease. It has been found that in such a case, the problems can be solved by mixing to the sulfolane solvent propylene carbonate or butylene carbonate as a solvent having a low solidifying point and excellent low temperature characteristics and electrochemical stability.

The content of propylene carbonate in the solvent mixture used in the present invention is preferably from 10 to 80% by volume, more preferably from 15 to 60% by volume, most preferably from 20 to 50% by volume, in order to obtain excellent electrochemical stability and low temperature characteristics at the same time even when a high voltage is applied. Likewise, the content of butylene carbonate in the solvent mixture, is preferably from 10 to 80% by volume, more preferably from 15 to 60% by volume, most preferably from 20 to 50% by volume.

Further, it has been found very effective to incorporate to the sulfolane solvent chlorobenzene

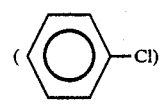

as a solvent having a low solidifying point and excellent low temperature characteristics and electrochemical stability. The content of chlorobenzene in the solvent mixture of the present invention, is preferably from 10 to 70% by volume, more preferably from 20 to 60% by volume, most preferably from 30 to 50% by volume, to satisfy the properties such as the electrochemical stability and low temperature characteristics when a high voltage is applied, and the solubility for electrolyte.

With respect to the electrolyte for the electrolyte solution of the present invention, there is no particular restriction. For instance, an electrolyte formed by the combination of a cation such as an alkali metal, an alkaline earth metal, tetraalkylammonium or tetraalkylphosphonium, with an anion such as tetrachloroaluminic acid, tetrafluoroboric acid, hexafluorophosphoric acid, hexafluoroarsenic acid, perchloric acid or trifluoromethanesulfonic acid, may suitably be used. Among these salts, a tetrafluoroborate, hexafluorophosphate, hexafluoroarsenate, perchlorate or trifluoromethanesulfonate of tetraalkylphosphonium or tetraalkylammonium is particularly suitable as the electrolyte for the present invention in view of the solubility to the solvent, the electric conductivity of the solution and the electrochemical stability.

There is no particular restriction as to the material for the polarizable electrodes to be used in the present invention. However, it is preferred to employ activated carbon powder or activated carbon fiber which is electrochemically inert to the electrolyte solution and which has a large specific surface area. Particularly preferred is an electrode obtained by adding a binder such as polytetrafluoroethylene (PTFE) to activated carbon powder, rolling the mixture to form a sheet, and, if necessary, subjecting the sheet to stretching treatment, since it is superior in the capacity per unit volume, in the strength and in the dependability for a long period of time.

Now, the present invention will be described in further detail with reference to Examples and Comparative Examples. However, it should be understood that the present invention is by no means restricted to such specific Examples.

EXAMPLES 1 to 11 and COMPARATIVE EXAMPLES 1 to 3

In the following Examples and Comparative Examples, the test apparatus was assembled as follows:

Firstly, in an internally threaded cylindrical nickel container having a bottom, an activated carbon fiber cloth (specific surface area: 2000 $m^2/g$, 3.14 $cm^2$, 0.4 mm in thickness) as a cathode side polarizable electrode, a separator made of a non-woven fabric of polypropylene (4.9 $cm^2$, 0.4 mm in thickness) and an activated carbon fiber cloth (3.14 $cm^2$, 2 mm in thickness) as an anode side polarizable electrode each impregnated with an electrolyte solution to be tested, were overlaid one after another. In this case, the activated carbon fiber cloths were arranged to face each other with the separator interposed therebetween.

Then, an externally and internally threaded ring of polytetrafluoroethylene was screwed in this container to fix the positions of the activated carbon fiber cloths and the separator.

Then, a threaded rod of polytetrafluoroethylene having provided at the forward end with a platinum net current collector (200 mesh) having a platinum lead wire, was screwed in the opening of the above-mentioned ring. The assembling was completed by confirming the electric connection of the platinum lead wire and the nickel container by an AC two-terminal method using a LCR meter. The platinum lead wire was led out through a hole provided at the center of the above-mentioned rod.

By using the test apparatus assembled as described above, the properties of capacitors in which various electrolyte solutions comprising the solutes and solvents as identified in Table 1, were used so that they were adequately impregnated to the anode and cathode composed of activated carbon fibers, were evaluated.

The evaluation was made with respect to the decomposition voltage of the electrolyte solution as an index for the working voltage, and the capacity retention after the storage at a high temperature. The measurements were conducted, respectively, as follows.

For the measurement of the decomposition voltage, the test capacitor was set, and then a direct current voltage was applied. Ten minutes later, the leakage current was measured, and the voltage at which the leakage current increased abruptly when the applied voltage was gradually increased, was taken as the decomposition voltage.

The measurement of the capacity retention (Io) after the storage at a high temperature, was conducted as follows. Firstly, a test capacitor was set, and then charging was conducted at a constant voltage of 2.8 V for 1 hour. Then, discharging was conducted at a constant current of 1 mA, whereby the time until the terminal voltage during the discharging became 1.0 V was measured, and the initial capacity (Fo) was calculated from the measured value.

Then, the same test cell was stored in a constant temperature tank of 85° C. for 1,000 hours while applying a voltage of 2.8 V, and then the capacity (F) after the storage was measured in the same manner as above, whereupon the capacity retention after the storage at a high temperature was calculated by Io=F/Fo×100.

The results of the tests in which the type of the electrolyte solution was varied, are shown in Table 1. Comparative Examples 1 to 3 represent conventional electrolyte solutions. In the Table, TEA represents tetraethylammonium, and TBA represents tetrabutylammonium.

TABLE 1

| | Electrolyte | | | Capacitor properties | |
|---|---|---|---|---|---|
| No. | Solvent | | Solute | Decomposition voltage (V) | Capacity retention Io (%) |
| Example | | | | | |
| 1 | Sulfolane | | 0.7 M TEA.BF$_4$ | 5.4 | 91 |
| 2 | Sulfolane | | 0.7 M TBE.BF$_4$ | 5.3 | 89 |
| 3 | 3-Methylsulfolane | | 0.5 M TEA.BF$_4$ | 5.4 | 88 |
| 4 | 2,4-Dimethylsulfolane | | 0.5 M TEA.BF$_4$ | 5.3 | 85 |
| 5 | Sulfolane | 70% | 0.6 M TEA.BF$_4$ | 5.4 | 90 |
| | 3-Methylsulfolane | 30% | | | |
| 6 | Sulfolane | 50% | 0.6 M TEA.BF$_4$ | 5.4 | 89 |
| | 3-Methylsulfolane | 50% | | | |
| 7 | Sulfolane | 30% | 0.5 M TEA.BF$_4$ | 5.4 | 88 |
| | 3-Methylsulfolane | 70% | | | |
| 8 | Sulfolane | 50% | 0.5 M TEA.BF$_4$ | 5.3 | 87 |
| | 2,4-Dimethylsulfolane | 50% | | | |

TABLE 1-continued

| No. | Electrolyte Solvent | | Solute | Capacitor properties Decomposition voltage (V) | Capacity retention Io (%) |
|---|---|---|---|---|---|
| 9 | Sulfolane<br>3-Methylsulfolane<br>2,4-Dimethylsulfolane | 60%<br>20%<br>20% | 0.6 M TEA.BF$_4$ | 5.3 | 88 |
| 10 | Sulfolane<br>Propylene carbonate | 70%<br>30% | 0.8 M TEA.BF$_4$ | 5.2 | 89 |
| 11 | 3-Methylsulfolane<br>γ-Butyrolactone | 70%<br>30% | 0.8 M TEA.BF$_4$ | 5.1 | 86 |
| Comparative Example | | | | | |
| 1 | Propylene carbonate | | 0.7 M TEA.BF$_4$ | 4.9 | 64 |
| 2 | γ-Butyrolactone | | 0.7 M TEA.BF$_4$ | 4.9 | 60 |
| 3 | Dimethylformamide | | 0.7 M TEA.BF$_4$ | 4.7 | 53 |

EXAMPLES 12 to 21 and COMPARATIVE EXAMPLE 4

In each of the Examples of the present invention and the Compartive Example, a unit cell (diameter: 20 mm, thickness: 2.0 mm) of a coin-shaped electric double layer capacitor as shown in FIG. 1 was prepared as follows.

Firstly, 10% by weight of polytetrafluoroethylene was added to activated carbon powder (specific surface area: 2000 m²/g), and the mixture was formed into a sheet by a wet-type kneading. The sheet thus obtained, was punched out to obtain disc-shaped polarizable electrodes 1 and 2 (diameter: 15 mm, thickness: 0.7 mm). These polarizable electrodes 1 and 2 facing to each other with a separator 3 of a non-woven fabric of polypropylene fiber interposed therebetween, were placed in a container comprising a stainless steel cap 4 and a stainless steel can 5. Then, the predetermined electrolyte solution was injected in the unit cell so that the polarizable electrodes 1 and 2 and the separator 3 were adequately impregnated with this electrolyte solution.

Then, the edges of the cap 4 and the can 5 were caulked with a polypropylene packing 6 interposed therebetween, for sealing.

By using the unit cell of an electric double layer capacitor prepared as described above, the initial capacity (Fo) and the internal resistance upon application of a voltage of 2.8 V were measured with respect to each of cells containing various electrolyte solutions as shown in Table 2, as solutes. Then, each cell was stored at 70° C. for 1000 hours while continuously applying a voltage of 2.8 V thereto, whereupon the capacity (F) and the internal resistance were measured. The measured values are presented in Table 2 so that they can readily be compared with the initial values. The internal resistance was measured by an alternate current two-terminal method (frequency: 1 KHz) at 20° C. and −10° C. The results of Examples 12 to 21 and Comparative Example 4 are shown in Table 2.

TABLE 2

| | Solvents | | | | Capacitor properties | | | | |
|---|---|---|---|---|---|---|---|---|---|
| | Sulfonate solvent (% by volume) | Propylene carbonate (% by volume) | Electrolyte and concentration | Initial values | | | After application of 2.8 V at 70° C. for 1000 hrs. | |
| | | | | Internal resistance Ω | | Capacity Fo | Internal resistance Ω | Capacity F |
| | | | | −10° C. | 20° C. | | | |
| Example | | | | | | | | |
| 12 | Sulfolane | 70 | 30 | 0.8 M (Et)$_4$NBF$_4$ | 30.2 | 11.2 | 2.42 | 18.5 | 2.18 |
| 13 | Sulfolane | 70 | 30 | 1.0 M (Bu)$_4$NPF$_6$ | 34.7 | 13.2 | 2.60 | 17.3 | 2.37 |
| 14 | Sulfolane | 70 | 30 | 1.2 M (Bu)$_4$PBF$_4$ | 35.8 | 12.8 | 2.38 | 16.6 | 2.29 |
| 15 | 3-Methylsulfolane | 60 | 40 | 1.0 M (Bu)$_4$PBF$_4$ | 41.3 | 14.7 | 2.36 | 20.9 | 2.22 |
| 16 | 2,4-Dimethylsulfolane | 60 | 40 | 1.0 M (Et)$_4$NBF$_4$ | 38.6 | 13.9 | 2.36 | 19.5 | 2.16 |
| 17 | Sulfolane | 90 | 10 | 1.0 M (Bu)$_4$PBF$_4$ | ∞ | 15.7 | 2.30 | 20.8 | 2.14 |
| 18 | Sulfolane | 20 | 20 | 1.0 M (Bu)$_4$PBF$_4$ | 43.7 | 14.5 | 2.34 | 21.8 | 2.15 |
| 19 | Sulfolane | 50 | 50 | 1.0 M (Bu)$_4$PBF$_4$ | 30.0 | 11.6 | 2.45 | 22.3 | 2.17 |
| 20 | Sulfolane | 20 | 80 | 1.0 M (Bu)$_4$PBF$_4$ | 24.5 | 9.8 | 2.52 | 24.6 | 2.01 |
| 21 | Sulfolane | 70 | 30 | 1.0 M LiBF$_4$ | 26.3 | 10.3 | 2.47 | 27.7 | 1.89 |
| Comparative Example | | | | | | | | | |
| 4 | — | | 100 | 1.0 M (Et)$_4$NBF$_4$ | 17.2 | 7.5 | 2.61 | 38.5 | 1.69 |

Note: Et: C$_2$H$_5$ (i.e. ethyl group), Bu: C$_4$H$_9$ (i.e. n-butyl group)

As is evident from Table 2, according to the present invention, it is possible to provide a highly reliable electric double layer capacitor having a small temperature dependency of the internal resistance and a small deterioration in the capacity as compared with the conventional capacitors even when a high voltage of a level of 2.75 V or higher is applied at a high temperature. Thus, when it is used at a constant level of 5.5 V as a memory back-up electric power source, it is possible to reduce the costs by changing the conventional three-cell structure to a two-cell structure. Further, with the two-cell structure, the capacity can h=increased by 1.5 times the capacity with the three-cell structure, which is practically extremely advantageous.

EXAMPLES 22 to 26 and COMPARATIVE EXAMPLE 5

In the same manner as in Examples 12 to 21, the initial capacity (Fo) and the internal resistance upon application of a voltage of 2.8 V were measured with respect to each of cells containing various electrolyte solutions wherein a solvent mixture of a sulfolane solvent and 1-butylene carbonate was used, as shown in Table 3. Then, each cell was stored at 70° C. for 1,000 hours while continuously applying a voltage of 2.8 V thereto, whereupon the capacity was measured, and the capacity deterioration rate (%) from the initial capacity (Fo) was calculated. The internal resistance was measured by an alternate current two-terminal method (frequency: 1 KHz) at 20° C. and −25° C. The results of Examples 22 to 26 and Comparative Example 5 are shown in Table 3.

EXAMPLES 27 to 33 and COMPARATIVE EXAMPLES 6 to 7

Figure 2:
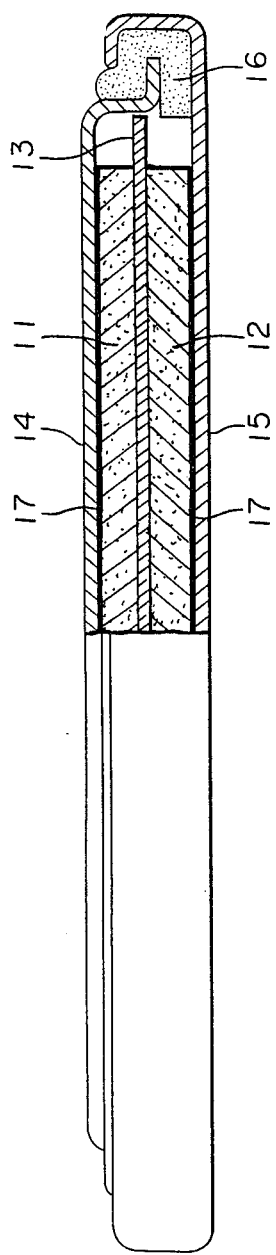
FIG. 2 is a partially cross-sectional view of another embodiment of the electric double layer capacitor of the present invention.

In each of the Examples of the present invention and the Compartive Example, a unit cell (diameter: 20 mm, thickness: 2.0 mm) of a coin-shaped electric double layer capacitor as shown in FIG. 2 was prepared as follows.

Firstly, 10% by weight of polytetrafluoroethylene was added to activated carbon powder (specific surface area: 2000 m$^2$/g), and the mixture was formed into a sheet by a wet-type kneading. The sheet thus obtained, was punched out to obtain disc-shaped polarizable electrodes 11 and 12 (diameter: 15 mm, thickness: 0.7 mm). These polarizable electrodes 11 and 12 facing to each other with a separator 13 of a non-woven fabric of polypropylene fiber interposed therebetween, were placed in a container comprising a stainless steel cap 14 and a stainless steel can 15 so that they were bonded a graphite type conductive adhesive 17. Then, the predetermined electrolyte solution was injected in the unit cell so that the polarizable electrodes 11 and 12 and the separator 13 were adequately impregnated with this electrolyte solution. Then, the edges of the cap 14 and the can 15 were caulked with a polypropylene packing 16 interposed therebetween, for sealing. The polarizable electrodes 11 and 12 were bonded to the inside of the cap 14 and the inside of the can 15, respectively, by the conductive resin layers 17.

TABLE 3

| | Solvents | | | | Capacitor properties | | | |
|---|---|---|---|---|---|---|---|---|
| | Butylene carbonate (% by volume) | Sulfolane solvent | (% by volume) | Electrolyte | Initial capacity (Fo) | Capacity deterioration (%) | Internal resistance Ω (20° C.) | Internal resistance Ω (−25° C.) |
| Example | | | | | | | | |
| 22 | 50 | Sulfolane | 50 | $(C_4H_9)_4PBF_4$ | 2.20 | 2.4 | 15.4 | 65.3 |
| 23 | 50 | Sulfolane | 50 | $(C_2H_5)_4NBF_4$ | 2.28 | 2.8 | 13.3 | 64.7 |
| 24 | 30 | 3-Methylsulfolane | 70 | $(C_4H_9)_4PBF_4$ | 2.32 | 2.9 | 18.2 | 73.8 |
| 25 | 33.3 | Sulfolane | 33.3 | $(C_4H_9)_4PBF_4$ | 2.31 | 3.0 | 21.2 | 88.2 |
| 26 | 33.3 | 3-Methylsulfolane | 33.3 | $(C_2H_5)_4NBF_4$ | 2.35 | 3.5 | 22.3 | 91.2 |
| Comparative Example | | | | | | | | |
| 5 | Propylene carbonate | | 100 | $(C_2H_5)_4NBF_4$ | 2.61 | 35.2 | 7.5 | 30 |

Note 1: The concentration of the electrolyte was 1.0 M in each of Examples and Comparative Example.
Note 2: The capacity deterioration rate (%) was measured after application of 2.8 V at 70° C. for 1,000 hours.

It is evident from Table 3 that by using an electrolyte solution in which a solvent mixture of a sulfolane solvent and butylene carbonate is used according to the present invention, it is possible to provide a highly reliable electric double layer capacitor having a small temperature dependency of the internal resistance, and small deterioration of the capacity as compared with the conventional electrolyte solutions even when a voltage as high as 2.75 V or higher is applied at a high temperature.

By using the unit cell of an electric double layer capacitor prepared as described above, the initial capacity (Fo) at 20° C. and the internal resistance upon application of a voltage of 2.8 V were measured at 20° C. and −10° C. with respect to each of cells containing various electrolyte solutions as shown in Table 4, as solutes. Then, each cell was stored at 70° C. for 1000 hours while continuously applying a voltage of 2.8 V thereto, whereupon the capacity (F) and the internal resistance were measured at 20° C. The measured values are presented in Table 4 so that they can readily be compared with the initial values. The internal resistance was measured by an alternate current two-terminal method (frequency: 1 KHz). The results of Examples 27 to 33 and Comparative Example 6 and 7 are shown in Table 4.

TABLE 4

| | Solvents | | Electrolyte and concentration | Capacitor properties | | | | |
|---|---|---|---|---|---|---|---|---|
| | | | | Initial values | | | After application of 28 V at 70° C. for 1000 hrs. | |
| | Sulfolane solvent (% by volume) | Chlorobenzene (% by volume) | | Internal resistance Ω | | Capacity Fo (F) | Internal resistance 20° C. Ω | Capacity F (F) |
| | | | | −10° C. | 20° C. | | | |
| Example | | | | | | | | |
| 27 | Sulfolane 60 | 40 | 0.8 M (Bu)$_4$PBF$_4$ | 31.5 | 12.1 | 2.37 | 19.3 | 2.09 |
| 28 | Sulfolane 60 | 40 | 0.4 M (Bu)$_4$PBF$_4$ 0.3 M (Et)$_4$PBF$_4$ | 28.8 | 11.0 | 2.42 | 17.4 | 2.15 |
| 29 | Sulfolane 60 | 40 | 0.3 M (Bu)$_4$NBF$_4$ 0.3 M (Et)$_4$NBF$_4$ | 27.4 | 10.8 | 2.44 | 16.5 | 2.09 |
| 30 | 3-Methylsulfolane 70 | 30 | 0.8 M (Bu)$_4$PBF$_4$ | 34.2 | 12.2 | 2.35 | 19.7 | 2.01 |
| 31 | 2,4-Dimethylsulfolane 70 | 30 | 0.8 M (Bu)$_4$PBF$_4$ | 33.1 | 12.4 | 2.36 | 20.8 | 2.00 |
| 32 | Sulfolane 40 | 60 | 0.7 M (Bu)$_4$PBF$_4$ | 28.4 | 11.3 | 2.39 | 20.5 | 1.98 |
| 33 | Sulfolane 80 | 20 | 0.8 M (Bu)$_4$PBF$_4$ | 37.9 | 13.9 | 2.29 | 24.6 | 2.05 |
| Comparative Example | | | | | | | | |
| 6 | Propylene carbonate 100 | — | 0.8 M (Bu)$_4$PBF$_4$ | 22.1 | 8.7 | 2.56 | 49.1 | 1.79 |
| 7 | Propylene carbonate 100 | — | 0.8 M (Et)$_4$NBF$_4$ | 19.3 | 7.9 | 2.62 | 37.3 | 1.70 |

Note: Et: C$_2$H$_5$ (i.e. ethyl group), Bu: C$_4$H$_9$ (i.e. n-butyl group)

What is claimed is:

1. An electric double layer capacitor utilizing an electric double layer formed by the interface of an electrolyte solution and polarizable electrodes, wherein the electrolyte solution comprises a solute dissolved in at least one solvent selected from the group consisting of sulfolane and a derivative thereof.

2. The capacitor according to claim 1, wherein the derivative of sulfolane is 3-methylsulfolane or 2,4-dimethylsulfolane.

3. An electric double layer capacitor utilizing an electric double layer formed by the interface of an electrolyte solution and polarizable electrodes, wherein the electrolyte solution comprises an electrolyte dissolved in a solvent mixture comprising propylene carbonate or butylene carbonate and at least one solvent selected from the group consisting of sulfolane and a derivative thereof.

4. A capacitor according to claim 3, wherein the solvent mixture contains from 10 to 80% by volume of propylene carbonate.

5. The capacitor according to claim 3, wherein the solvent mixture contains from 10 to 80% by volume of butylene carbonate.

6. The capacitor according to claim 3, wherein the electrolyte is a salt formed by the combination of a cation of tetraalkylphosphonium or tetraalkylammonium with an anion of tetrafluoroboric acid, hexafluorophosphoric acid, hexafluoroarsenic acid, perchloric acid or trifluoromethane sulfonic acid.

7. An electric double layer capacitor utilizing an electric double layer formed by the interface of an electrolyte solution and polarizable electrodes, wherein the electrolyte solution comprises an electrolyte dissolved in a solvent mixture comprising chlorobenzene and at least one solvent selected from the group consisting of sulfolane and a derivative thereof.

8. The capacitor according to claim 7, wherein the solvent mixture contains from 10 to 70% by volume of chlorobenzene.

9. The capacitor according to claim 7, wherein the electrolyte is a salt formed by the combination of a cation of tetraalkylphosphonium or tetraalkylammonium with an anion of tetrafluoroboric acid, hexafluorophosphoric acid, hexafluoroarsenic acid, perchloric acid or trifluoromethane sulfonic acid.

* * * * *